Figure 1:
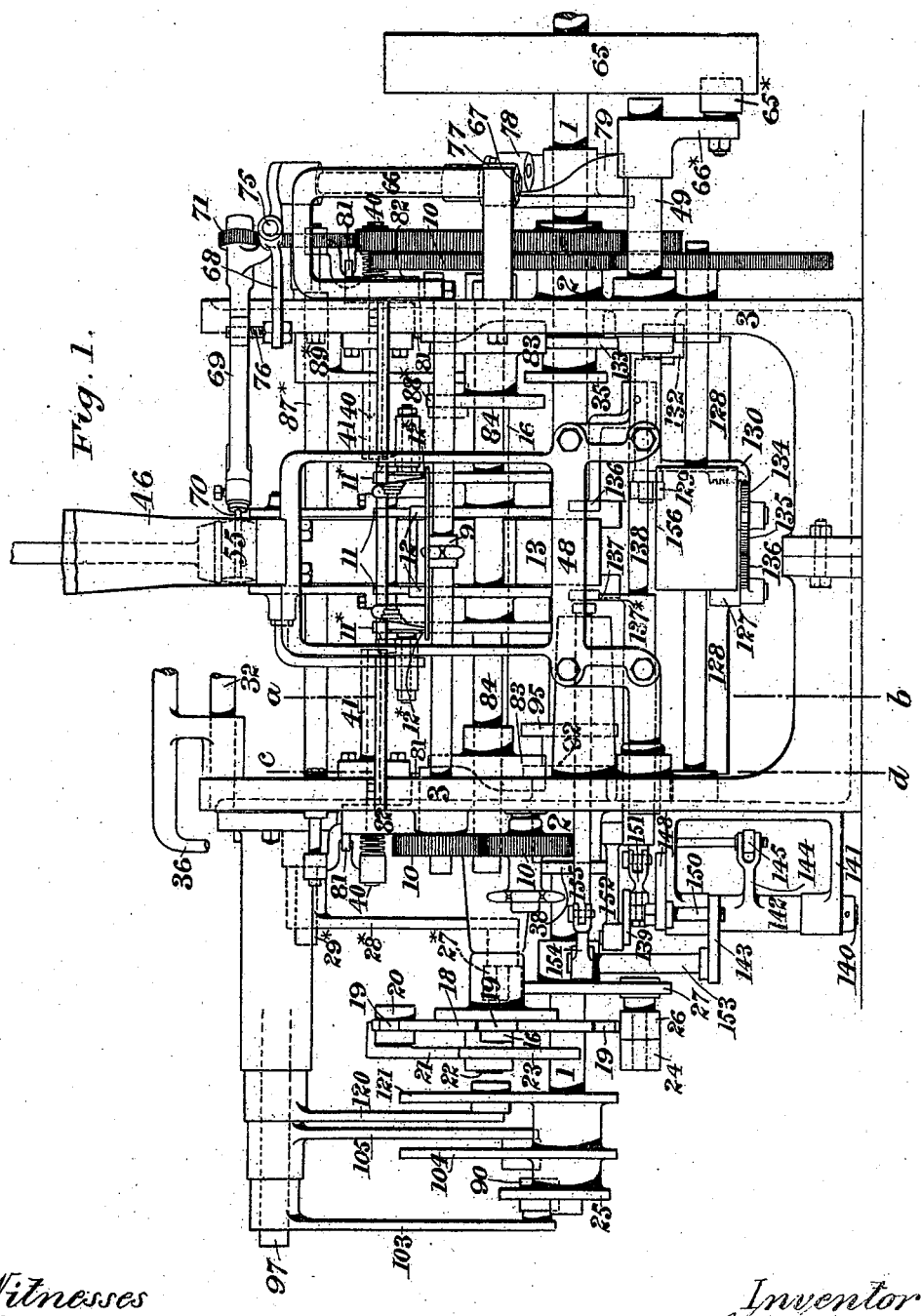

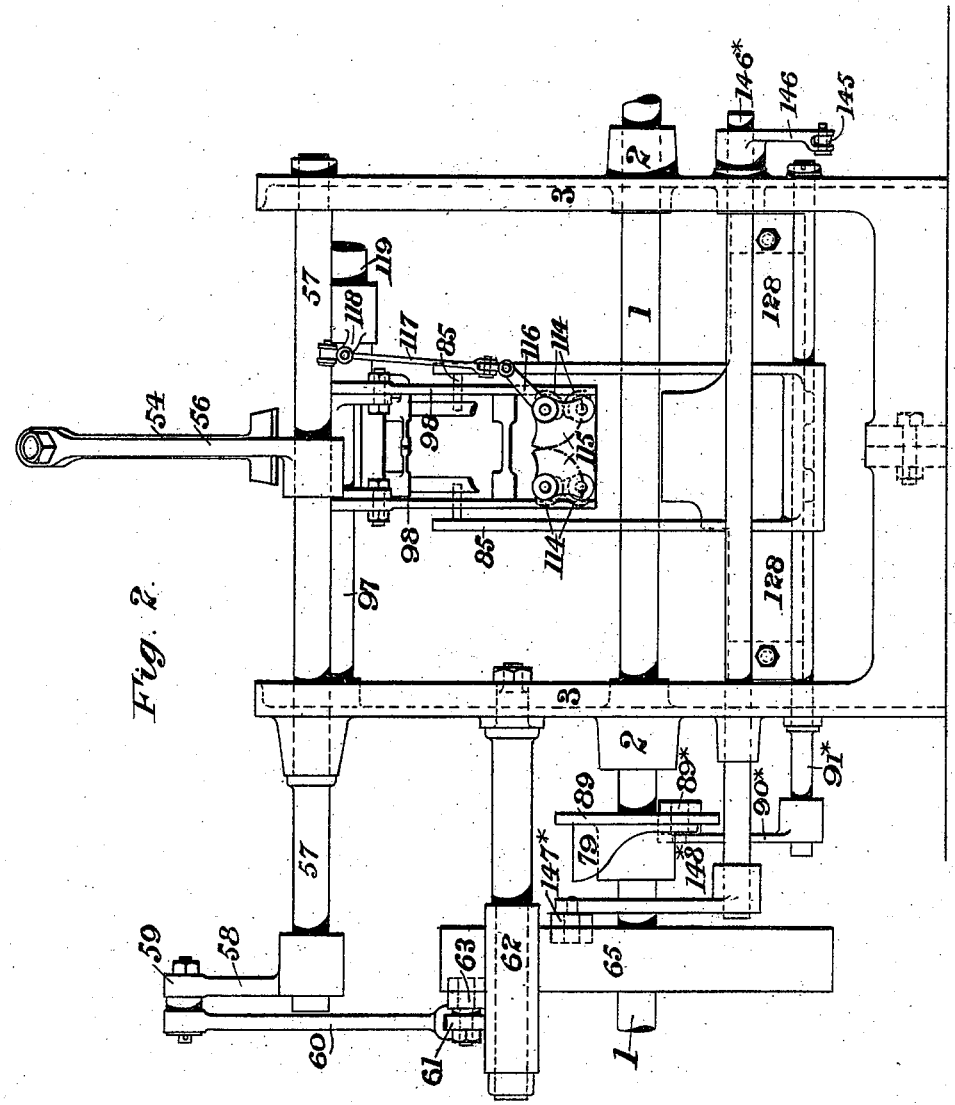

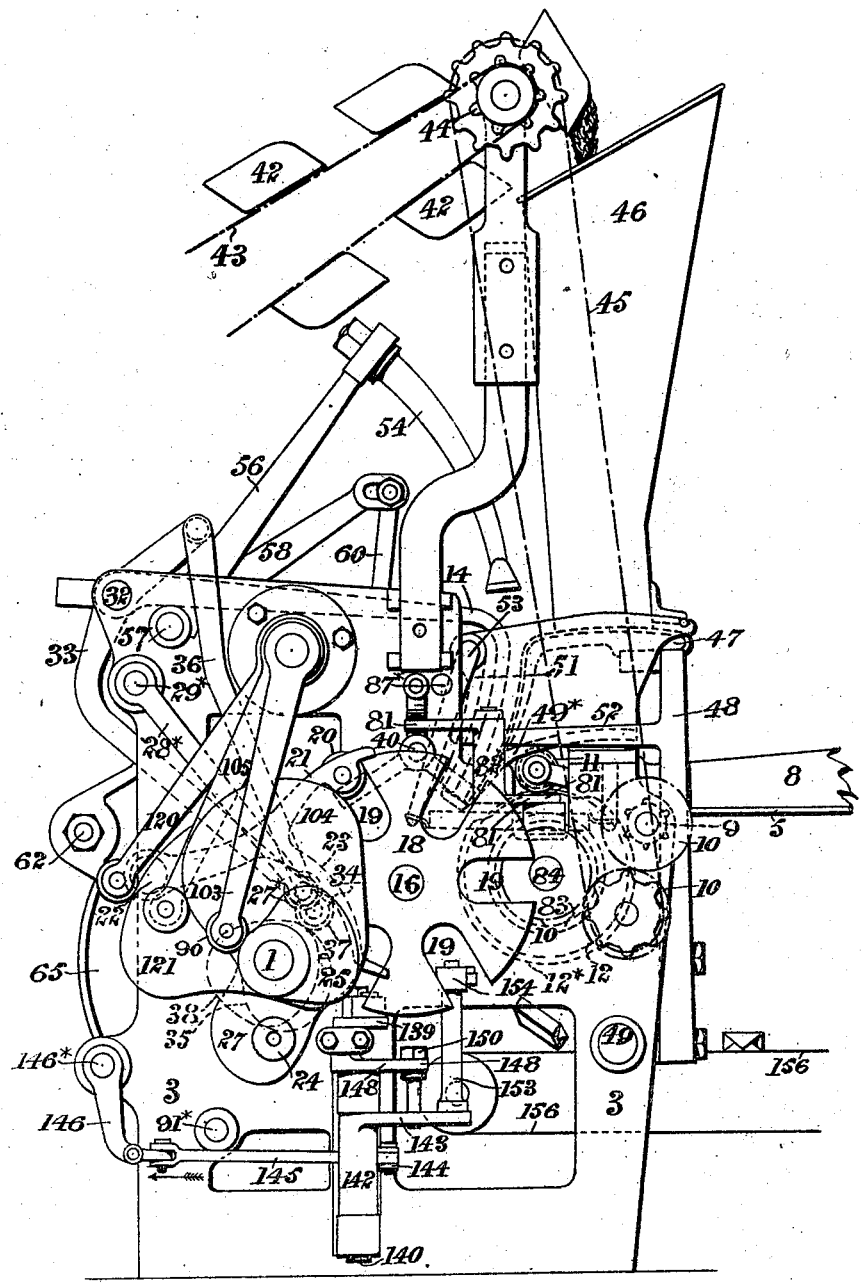

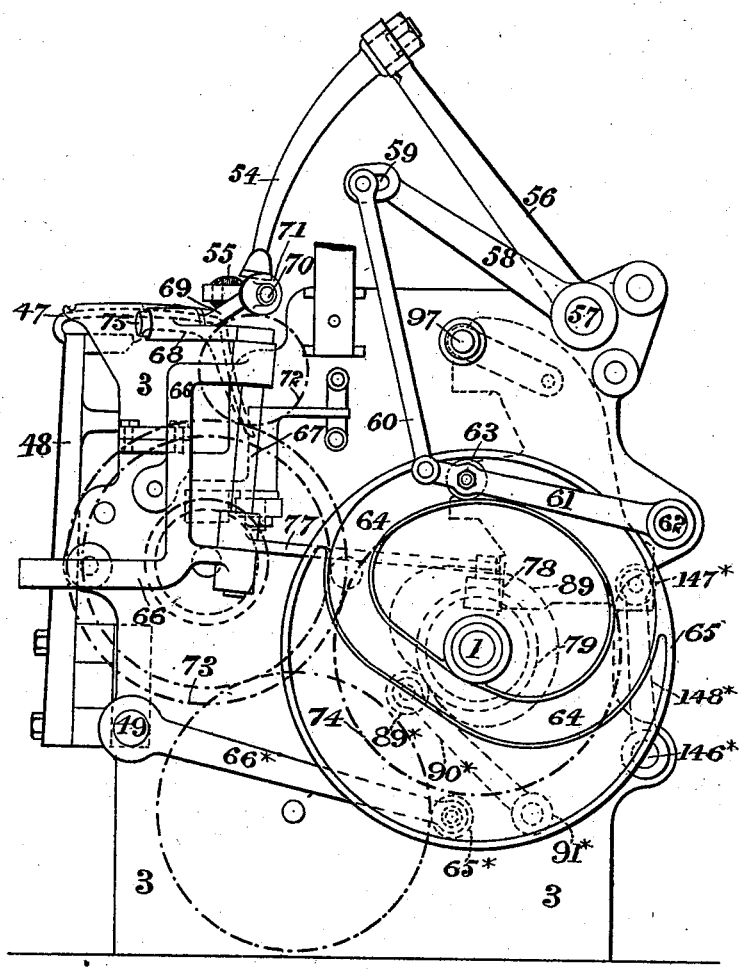

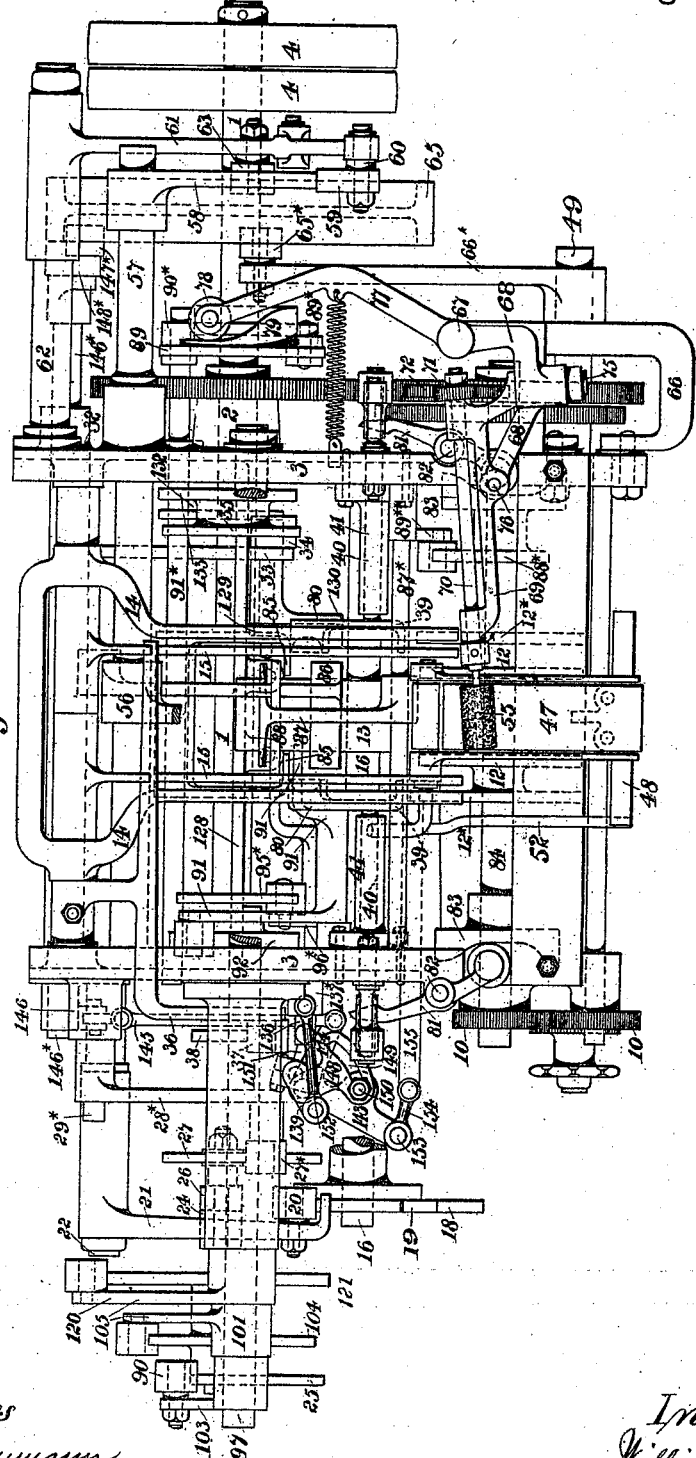

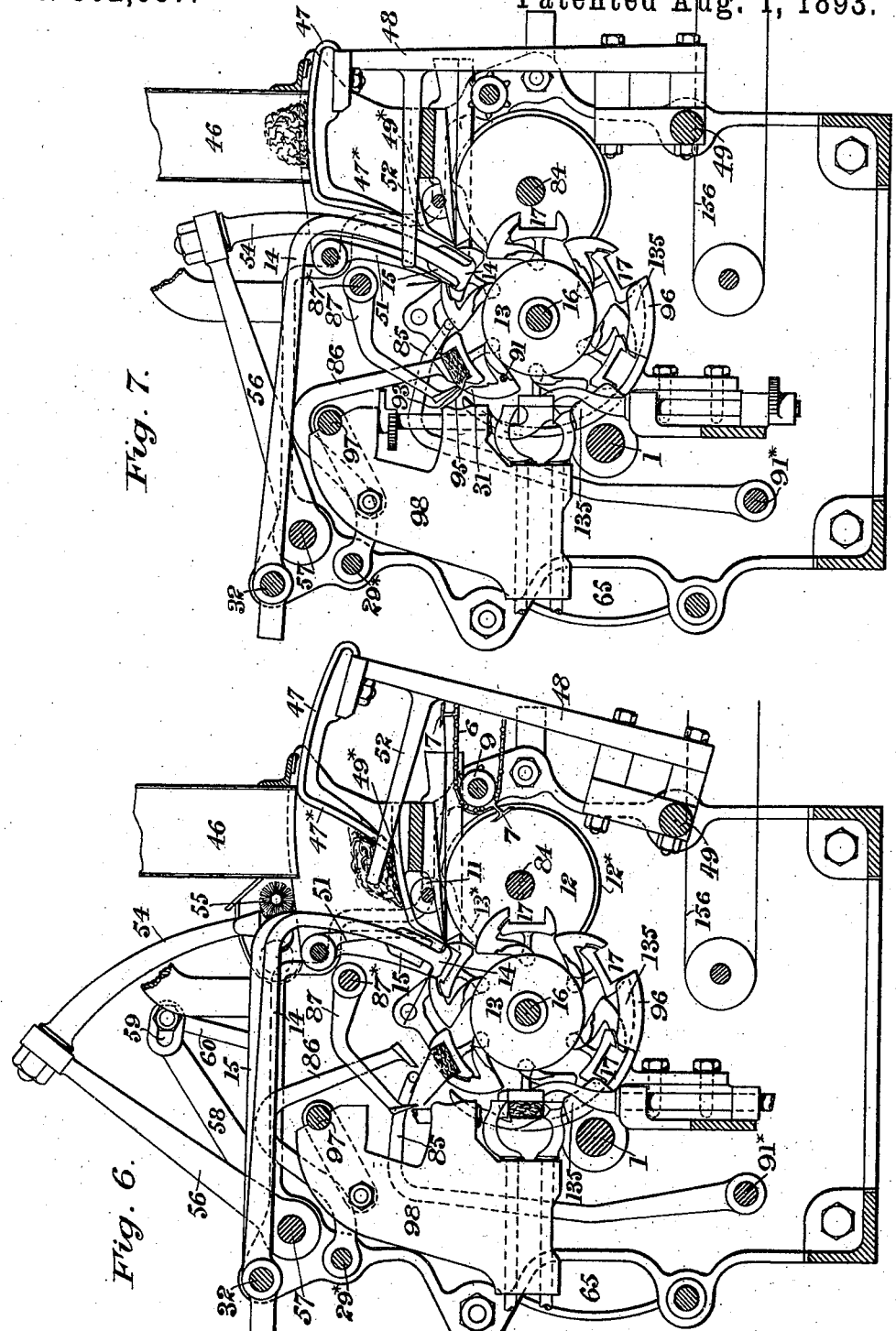

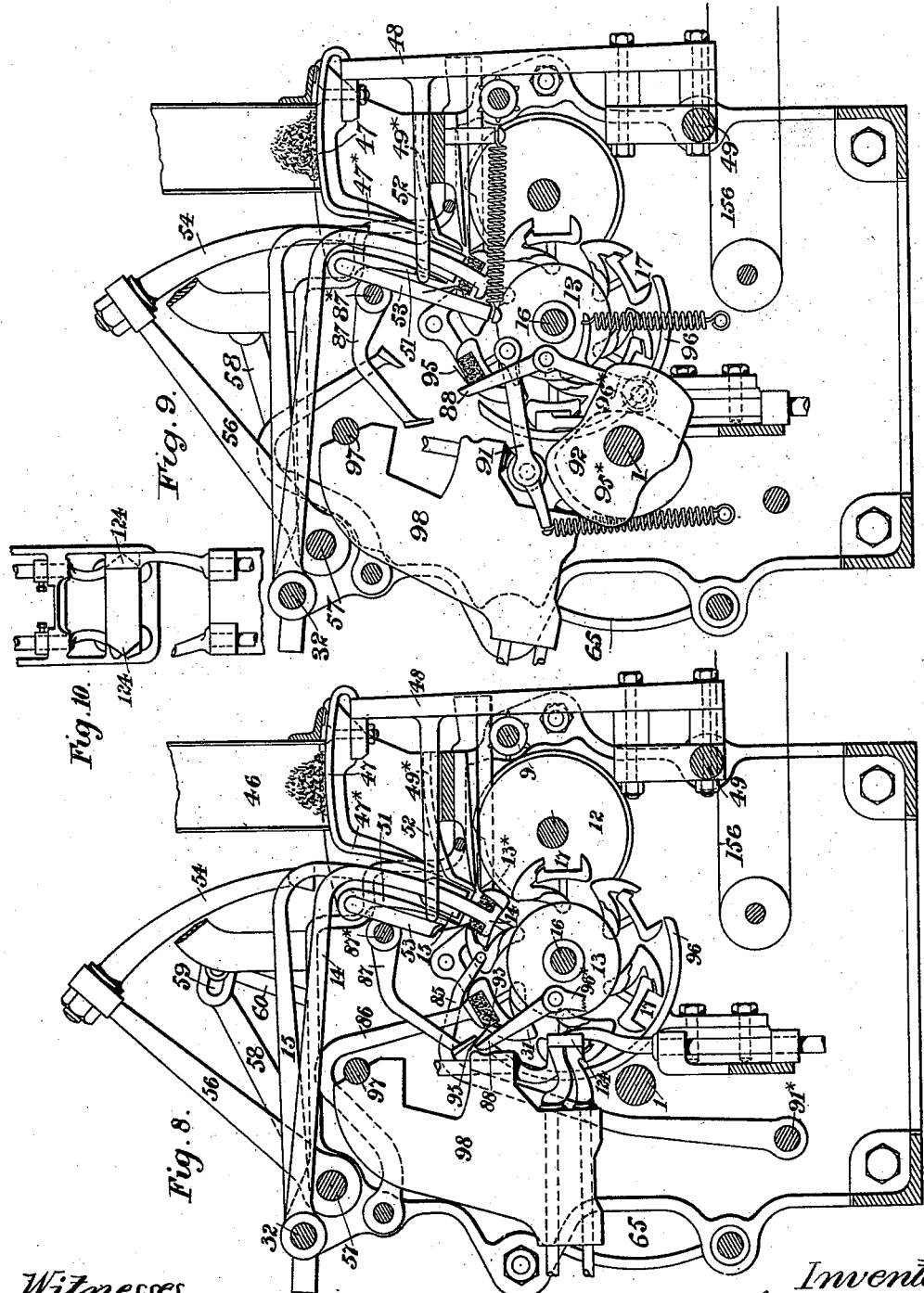

(No Model.) 17 Sheets—Sheet 8.

W. ROSE.
MACHINERY FOR MAKING UP TOBACCO INTO PACKETS.

No. 502,637. Patented Aug. 1, 1893.

Witnesses
George Baumann
James Gracie

Inventor
William Rose
By his Attorneys
Howson and Howson

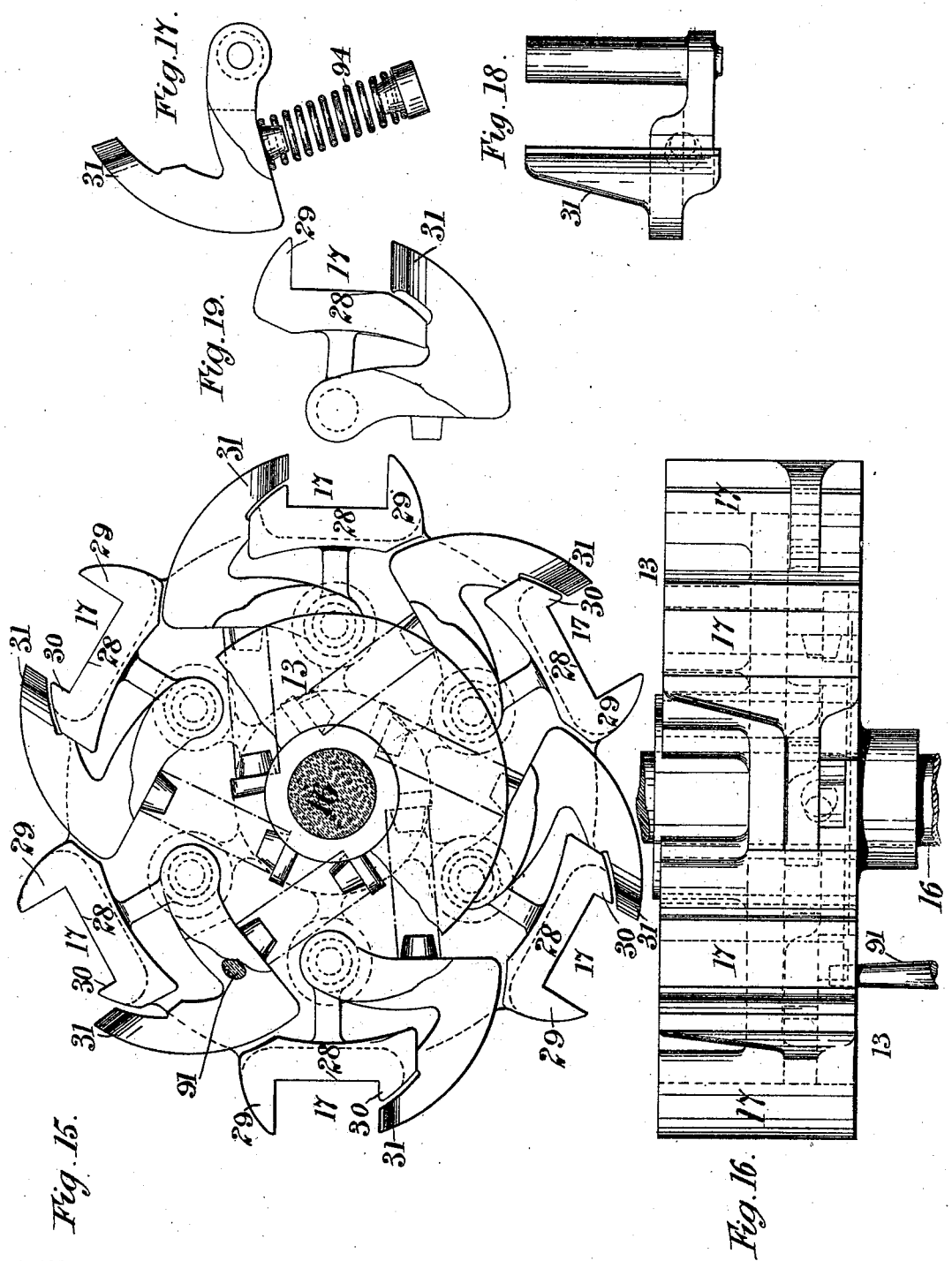

(No Model.) 17 Sheets—Sheet 10.
W. ROSE.
MACHINERY FOR MAKING UP TOBACCO INTO PACKETS.
No. 502,637. Patented Aug. 1, 1893.
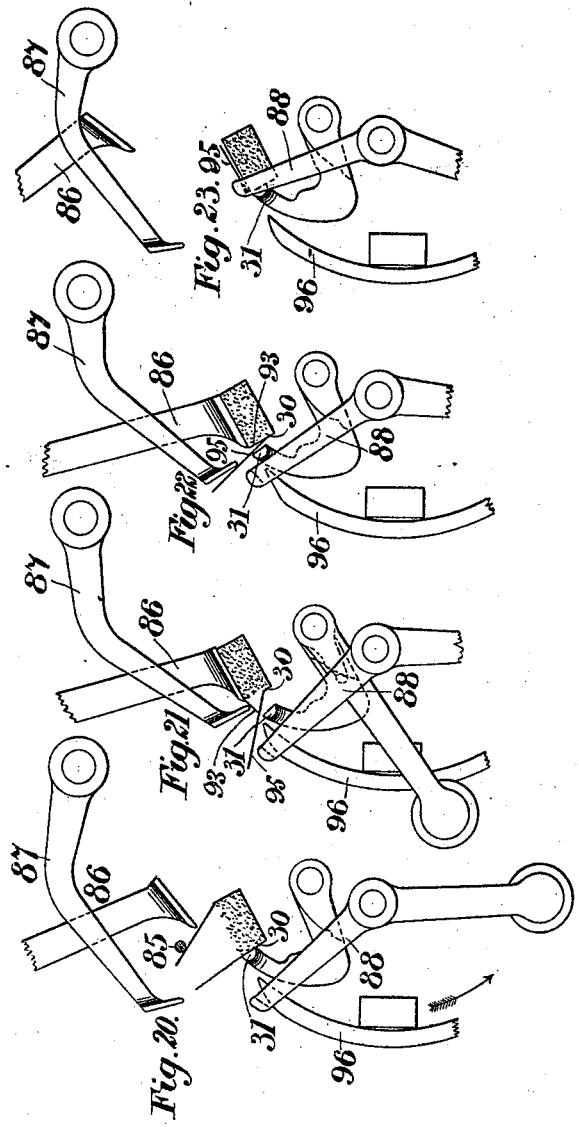
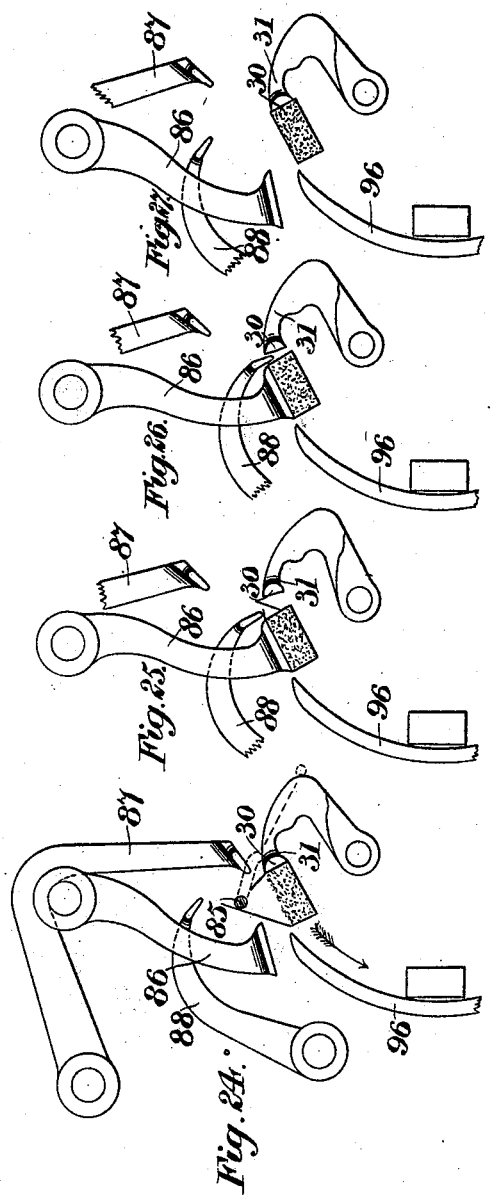
WITNESSES
George Baumann
James Gracie
INVENTOR
William Rose
By his Attorney
Howson V Howson

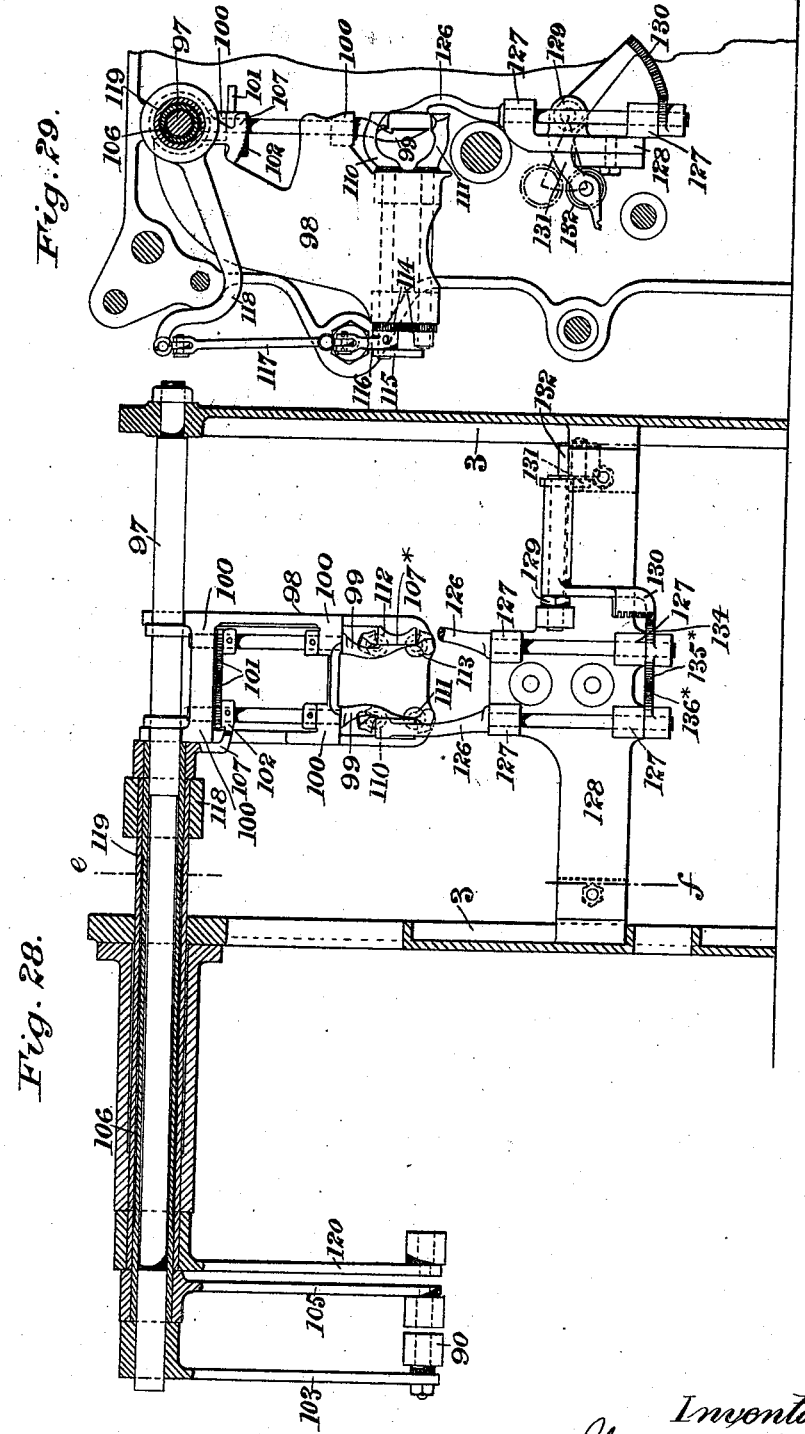

(No Model.)
W. ROSE.
MACHINERY FOR MAKING UP TOBACCO INTO PACKETS.
No. 502,637. Patented Aug. 1, 1893.
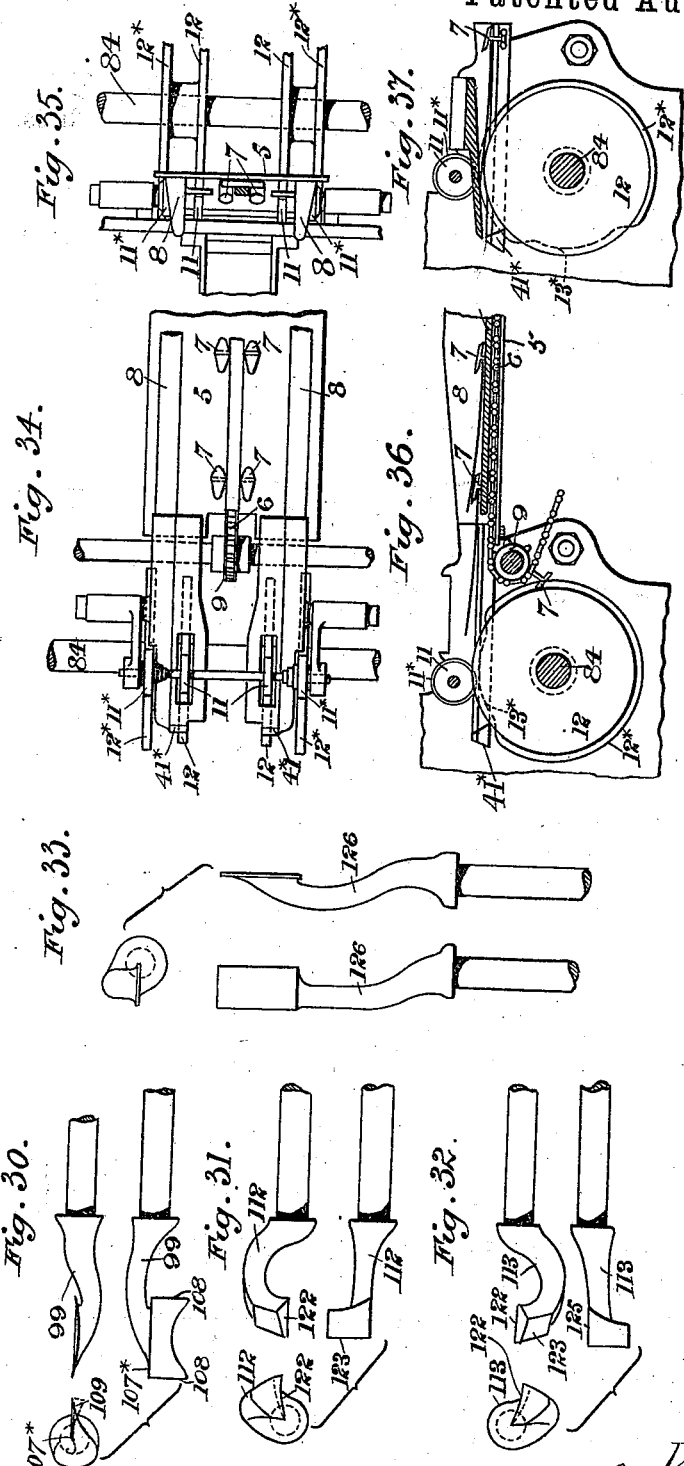
Witnesses
George Baumann
James Gracie
Inventor
William Rose
By his Attorneys
Howson and Howson (No Model.) 17 Sheets—Sheet 13.
W. ROSE.
MACHINERY FOR MAKING UP TOBACCO INTO PACKETS.
No. 502,637. Patented Aug. 1, 1893.
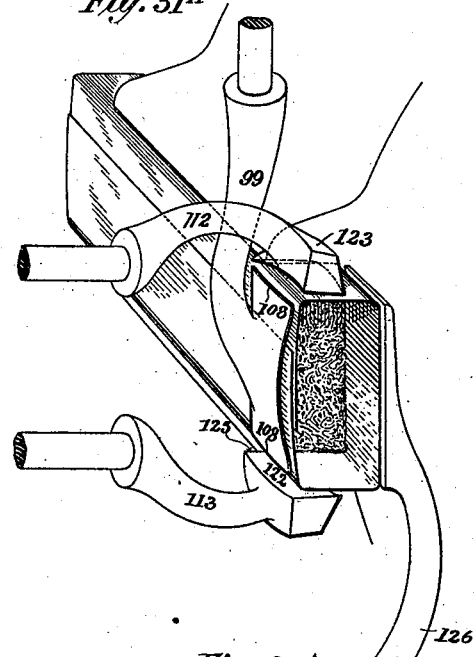
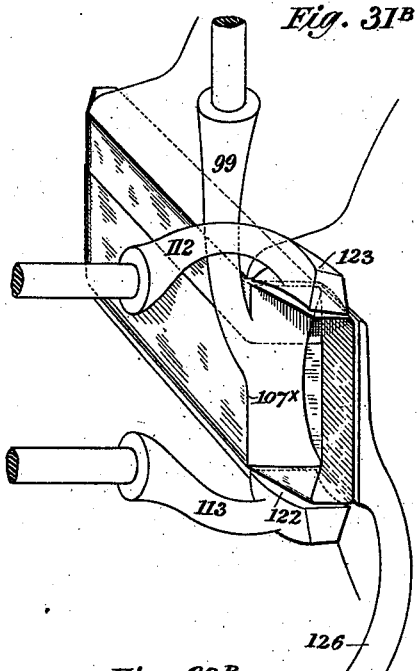
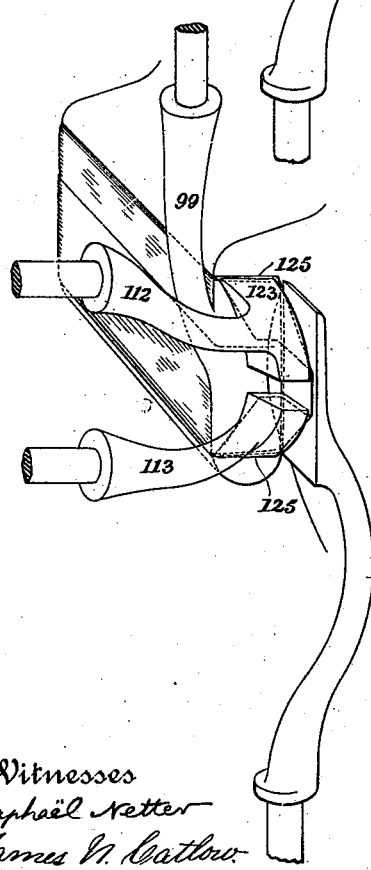
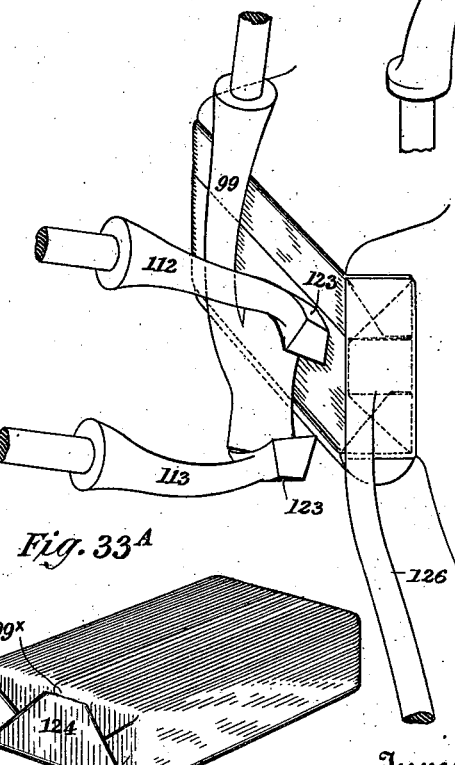
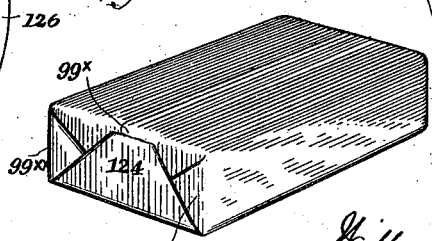
Witnesses
Raphaël Netter
James N. Catlow
Inventor
William Rose
By his Attorneys
Howson and Howson

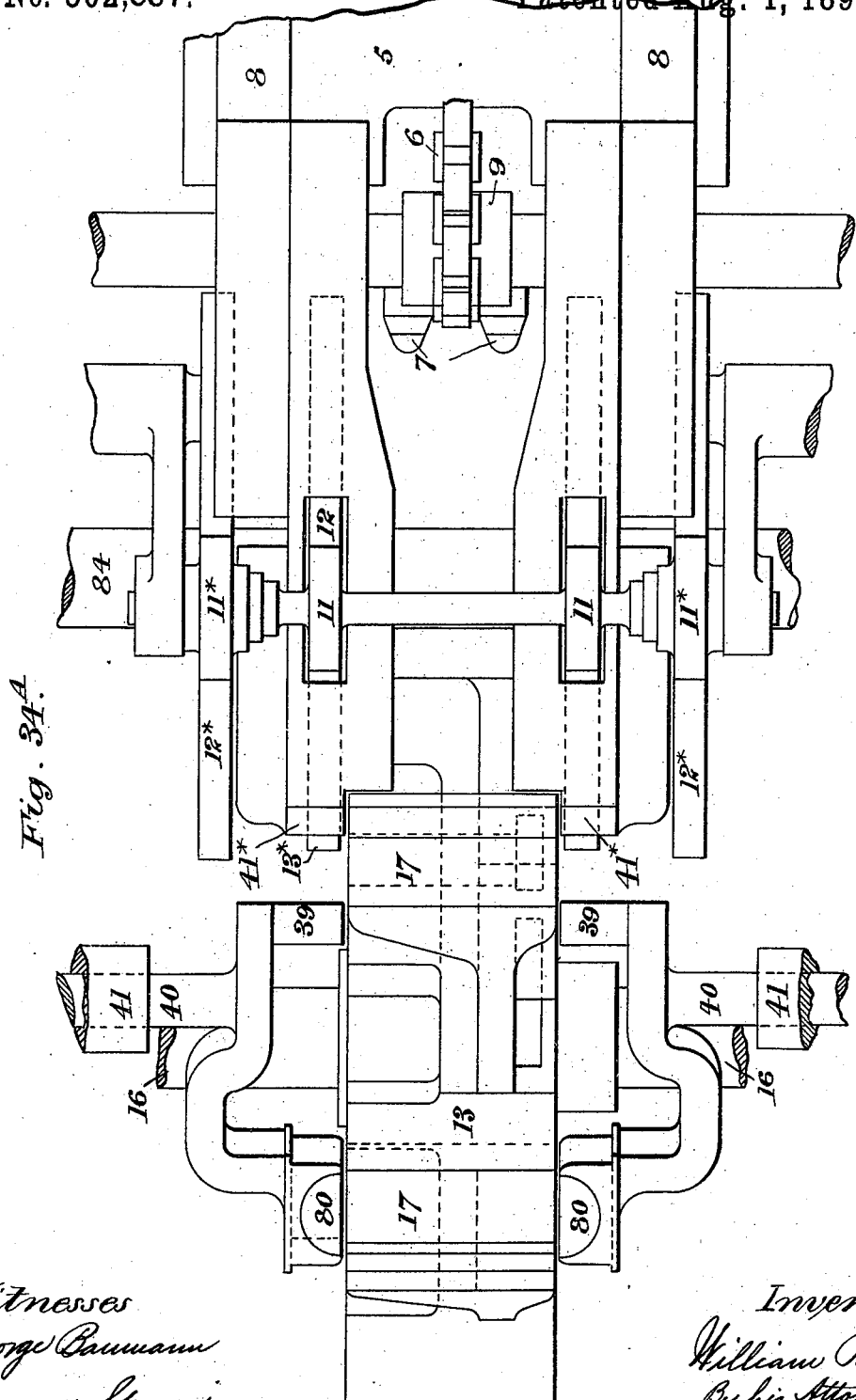

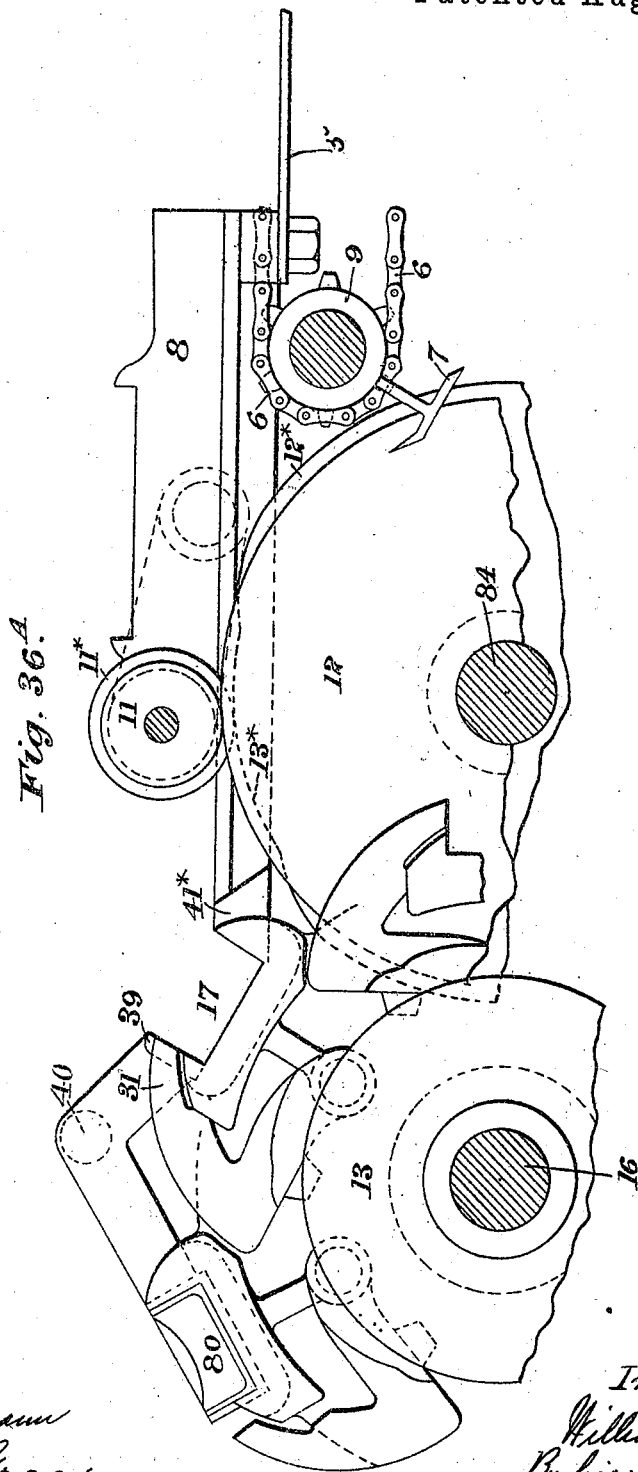

(No Model.) 17 Sheets—Sheet 16.
W. ROSE.
MACHINERY FOR MAKING UP TOBACCO INTO PACKETS.
No. 502,637. Patented Aug. 1, 1893.
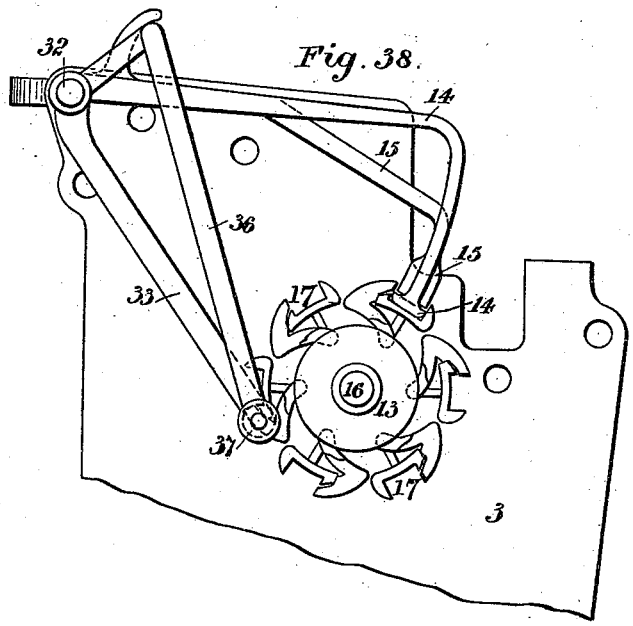
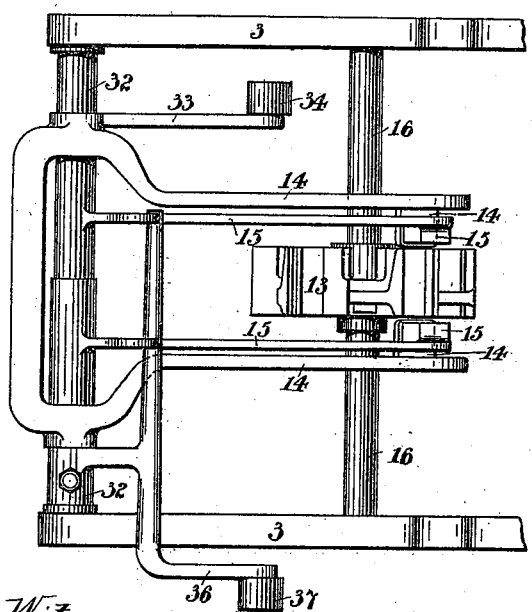
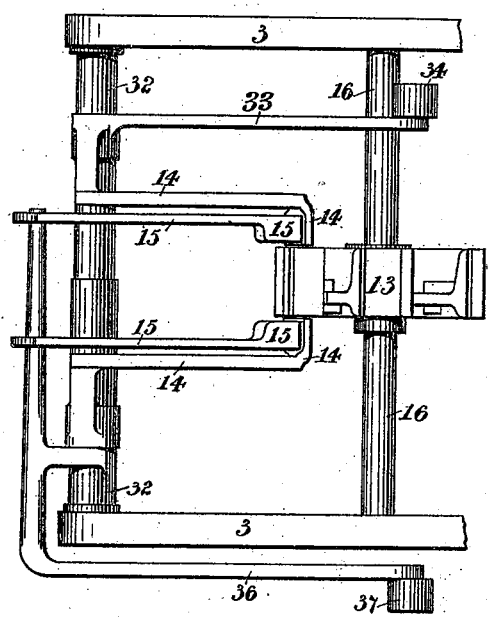

(No Model.) 17 Sheets—Sheet 17.
W. ROSE.
MACHINERY FOR MAKING UP TOBACCO INTO PACKETS.
No. 502,637. Patented Aug. 1, 1893.
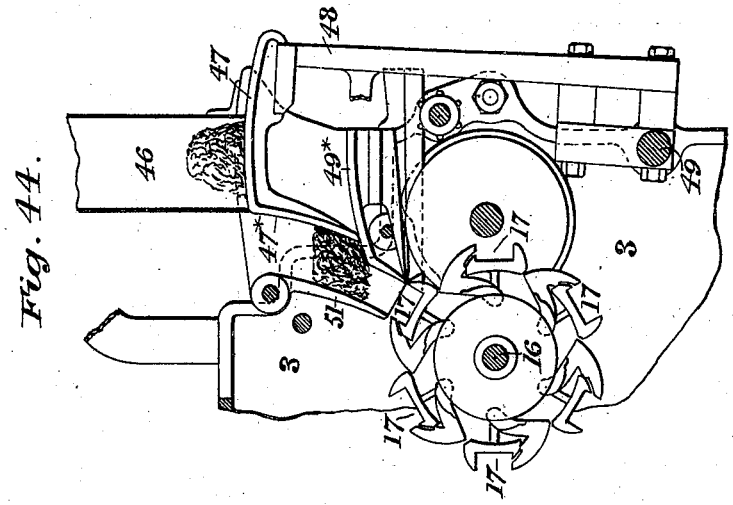
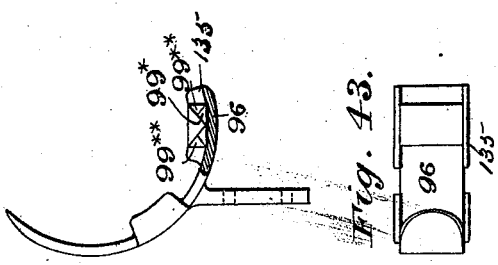

UNITED STATES PATENT OFFICE.

WILLIAM ROSE, OF GAINSBOROUGH, ENGLAND, ASSIGNOR TO RICHARD HARVEY WRIGHT, OF NEW YORK, N. Y.

MACHINERY FOR MAKING UP TOBACCO INTO PACKETS.

SPECIFICATION forming part of Letters Patent No. 502,637, dated August 1, 1893.

Application filed September 13, 1892. Serial No. 445,824. (No model.)

*To all whom it may concern:*

Be it known that I, WILLIAM ROSE, engineer, a subject of the Queen of Great Britain and Ireland, residing at Market Street, Gainsborough, in the county of Lincoln, England, have invented certain Improvements in Machinery for Making Up Tobacco and other Similar Materials in Packets, of which the following is a specification.
This invention has for its object to provide a machine for making rectangular packets of tobacco or other material.

According to this invention the paper or material in which the tobacco or the like is packed is folded round the contents of the packet by means of folding mechanism hereinafter described.

The wrappers which I will refer to as papers although other material may be used are fed into position over mold boxes which are carried by a revolving wheel and the tobacco or other material to be packed is introduced into the wrappers in the mold boxes by means of a pusher plate and plunger as hereinafter described. The mold boxes are each of rectangular form corresponding to the shape of the packet to be produced. The upper half of either the forward side, or the rearward side, of each mold box, is capable of moving outward, and the ends of the box are formed temporarily by removable plates, which act upon blocks or platforms capable of receding to allow the paper to be pressed down to the bottom of the box and serve to retain the paper in the correct position. In order to cause the paper to enter the mold box without creasing, bars are temporarily brought into position opposite the ends of the mold box to form extensions of the sides thereof. The extension for the rear side of each mold box may be a fixture but the extension for the forward side is movable and arranged to retire automatically after the paper has been pressed down so as to allow of the forward movement of the box when the wheel makes the partial rotation which brings the package under the first folding devices. Either the leading side or the rear side of each mold box is hinged or made removable (the folding devices being arranged accordingly) so as to permit of the folders acting properly on the wrappers as hereinafter described. The longitudinal edges of the wrapper are folded over the tobacco or the like by the consecutive actions of a series of folding instruments or folders the first of which is actuated by suitable mechanism so as to smooth down one side or edge of the wrapper and at the same time press the tobacco of the like in the mold box. Another or second folder then similarly presses down the opposite side or edge of the wrapper, after which other folding devices act in succession upon the projecting ends of the wrapper and form the folds at the ends of the packet. After the ends of the wrapper are folded a final pressure may be given to the ends if desired so as to prevent the folds from opening out again. The mold wheel then rotates so as to bring the finished packet into position to be ejected from the mold box, another of the mold boxes being then in position to receive a charge of tobacco or the like.

Figure 11:
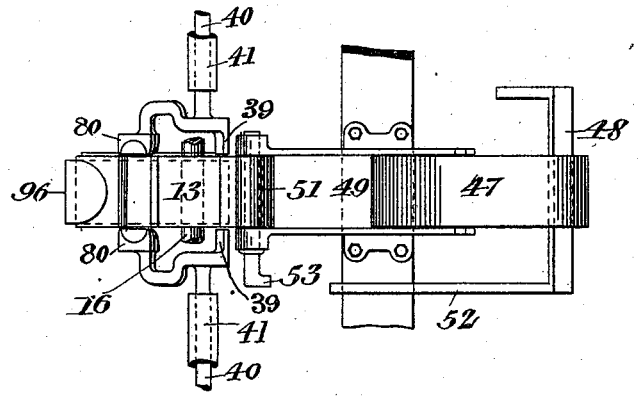
Figure 12:
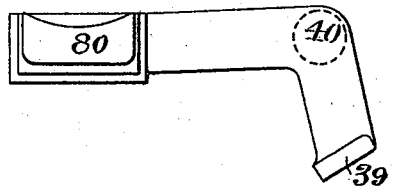
Figures 13, 14:
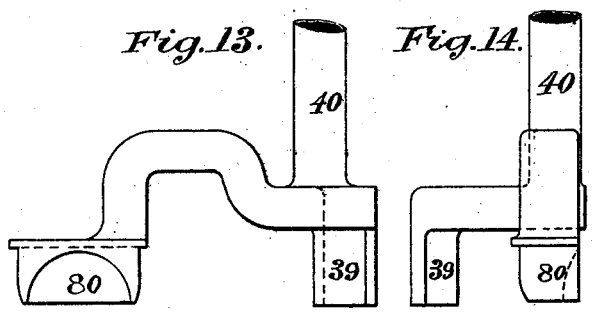

Figures 1 and 2 of the drawings are elevations of the two opposite sides of a machine constructed according to this invention, Fig. 1 being a view looking from the side where the wrappers are fed into the machine, and Fig. 2 being a view of the side at which the material to be packed is supplied, parts of the mechanism being removed for the purpose of showing more clearly the folding mechanism. Figs. 3 and 4 are elevations of the two opposite ends of the machine and Fig. 5 is a plan. Figs. 6, 7, 8 and 9 are sectional elevations showing the folding mechanism in the various stages of the operation in forming a packet. Fig. 10 is a partial end elevation of the mechanism for closing in the ends of the packet. Fig. 11 is a plan of part of the machine showing the bars or blocks forming the temporary extensions of the mold box and Figs. 12, 13 and 14 are enlarged views of one of the said bars. Figs. 15 and 16 are respectively an elevation and a plan of the mold wheel containing the recesses or mold boxes in which the packets are formed. Fig. 17 shows in elevation the movable portion of one side of a mold box. Fig. 18 is a plan of the same. Fig. 19 is an elevation of a mold box having the whole of one side movable. Figs. 20, 21, 22 and 23 are elevations showing the various positions of the folders while forming a packet, the wrapping being finished on that side of the packet which is uppermost in the mold box. Figs. 24, 25, 26 and 27 are elevations showing the various positions of the folders when arranged so as to complete the wrapping at the rear side of the packet. Fig. 28 is an elevation and partial section of the mechanism for folding the ends of the packet. Fig. 29 is an elevation at right angles to Fig. 28. Fig. 30 shows one of the folders for forming the first fold at the ends of the packet, detached. Figs. 31 and 32 are views of the folders for forming the two successive folds at each end of the packet. Figs. $31^A$, $31^B$, $32^A$, $32^B$ are views in perspective of fingers for making the end folds of the packet, and a packet showing the position of the fingers during their successive operation of making the end folds. Fig. 33 is a view of one of the folders for forming the final folds at the ends of the packet, and Fig. $33^A$ is a view in perspective of a packet, showing the end folds. Fig. 34 is a plan, Fig. 35 an end view and Fig. 36 a longitudinal section of the wrapper feeding mechanism. Fig. $34^A$ is an enlarged plan view of the wrapper feeding mechanism, mold wheel and mold boxes, and Fig. $36^A$ is an enlarged view in elevation of the same parts. Fig. 37 is a longitudinal section of the wrapper nipping device by which the wrappers are fed onto the mold wheel. Fig. 38 is a side elevation and Fig. 39 a plan of the levers and presses for placing the wrapper in position on a mold box. Fig. 40 is an elevation at right angles to Fig. 38. Fig. 41 is a side elevation, Fig. 42 a front view and Fig. 43 a plan of a circular plate arranged in proximity to the mold wheel for retaining the packets in the mold box while being formed. Fig. 44 is a sectional elevation of the tobacco feeding mechanism.

The main shaft 1 of the machine by which motion is given to the various parts as hereinafter described is mounted in bearings 2 in the main frame or standards 3 and carries fast and loose driving pulleys 4 by which motion may be given to the machine from any suitable prime mover. This shaft also carries the various cams and gearing by which the motions hereinafter described are obtained.

The wrappers which may be of paper or other suitable material having been cut to the requisite size are fed singly onto a trough 5, Figs. 3, 34 and 36, along which trough passes one portion of an endless chain 6 provided with attachments or propellers 7 at suitable distances apart for the forward end or edge of a wrapper to rest on one attachment while the rear end or edge of the same wrapper is engaged by the next rearward attachment while the sides 8 of the trough serve as guides against which the side edges of the wrappers bear while being carried into the machine by the attachments 7. The endless chain 6 is carried on pitch wheels 9 (one only of these pitch wheels being shown) receiving motion by means of gearing 10 from the shaft 84. The chain 6 receives a continuous motion and carries each wrapper in succession into position to be gripped at their side edges between two pairs of rollers or disks 11 and 12 which carry the wrapper forward into position over a mold box in the mold wheel 13 to be engaged by a gripping device 14, 15 shown clearly in Figs. 6, 7, 8, 38, 39 and 40. The wrapper is released from the grip of the disks 11 and 12 at the required period by disks $12^×$ on the spindle of the disks 12 acting on disks $11^×$ on the spindle of the disks 11 so as to raise and hold the disks 11 out of contact with the disk 12 until recesses $13^×$ in the disks $12^×$ come opposite to the disk $11^×$ which recesses allow the disks 11 to descend onto the disks 12 and remain in contact until the wrapper is carried into position to be gripped by the gripping device 14, 15.

The mold wheel 13 is fast on a shaft 16 and is provided with any desired number of (six shown in the drawings) recesses or mold boxes 17 in which the packets are formed. On this shaft 16 is also keyed a plate 18 Figs. 1, 3 and 5 having therein a series of notches 19 corresponding in number to the number of mold boxes in the mold wheel 13. With the notches 19 are caused to engage at the required periods a roller 20 to retain the mold wheel stationary while a packet is being formed, the said roller being carried on an arm or lever 21 mounted on a stud 22 on the main frame 3. The lever or arm 21 has a tail piece 23 see Fig. 3 on which a friction bowl 24 on a cam 27 acts so as to raise the roller out of engagement with a notch in the plate or disk 18 at the required periods. When the roller 20 is raised out of engagement with the notched plate or disk another friction bowl 26 carried on the cam 27 enters one of the said notches and by the rotation of the cam 27 imparts to the mold wheel a motion of rotation equal to the distance between two mold boxes.

The mold boxes 17 which may be square or of any other rectangular form each consist of a bottom 28 and two sides 29 and 30 as is clearly shown in Figs. 15 and 16, one of the sides namely 30 being formed by a fixed part, extending to only part of the depth of the mold and a removable part 31, which when in position completes the said side of the mold box; but if desired the whole of one side may be removable as shown by Fig. 19. This movable side or part movable side may be the forward side, as shown in Figs. 15, 20, 21, 22 and 23 or it may be the rear side as shown in Figs. 19, 24, 25, 26 and 27, according to the arrangement of the folders. The wrapper gripping device 14, 15 is mounted on a spindle 32 the part 14 having an arm 33 carrying a friction bowl 34 which is acted upon by a cam 35 on the main shaft 1. The part 15 of this gripping device is also provided with an arm 36 carrying a friction bowl 37 acted on by a cam 38 on the main shaft. The gripping face of the part 14 of the gripping device is normally held in position level with the outer edge of the mold box and the part 15 is normally at a short distance above it as shown in Fig. 6. The cams 35, 38 which operate the parts 14 and 15 are timed so that when a wrapper is brought by the disks 11 and 12 into position over a mold box the part 15 is caused to descend and grip the two opposite edges of the wrapper between the parts 14 and 15 and then both parts are caused to descend and carry the wrapper to the bottom of the mold box as shown in Fig. 7. In order to prevent the wrapper from creasing or tearing when entering the mold box the forward side of the mold box when in position to receive the wrapper is temporarily prolonged by projections 39 carried by rods 40 fitted to slide longitudinally in sockets 41 (Fig. 11) secured to the main frame 3. The rear side of the mold box is also temporarily prolonged by projections $41^x$ carried on the forward end or extension of the trough 5 along which the wrappers travel. These rear side extensions $41^x$ are clearly shown in Figs. 34, 36 and 37 and may be permanently fixed in position, but the forward side extensions 39 are arranged to retire automatically after the paper has been pressed down into the mold box so as to allow of the next forward movement of the mold wheel.

The charges of material, (which we will assume to be tobacco) to be inclosed in the wrappers, after being weighed, are placed in buckets or conveyers 42 on an endless band or chain 43 (see Fig. 3) carried on pitch wheels 44 and driven by a chain 45 and the gearing 10 which also operates the wrapper feeding device hereinbefore referred to. The separate charges of tobacco are discharged from the buckets 42 at suitable intervals into the hopper 46 the bottom 47 of which is movable and constitutes also a pusher plate for feeding the tobacco onto the wrappers in the mold boxes. This movable bottom 47 is carried on a frame 48 mounted on a shaft 49 and is operated at the requisite periods by a cam 65 acting on a friction bowl $65^x$ carried on an arm $66^x$ fast on the shaft 49. The tobacco on leaving the buckets falls on to and rests on the top or upper surface of the movable bottom or pusher plate 47 as shown in Figs. 7 and 8 after which the said pusher plate is moved outward into the position shown in Fig. 6 thereby allowing the tobacco to fall from the hopper on to a plate $49^x$ below. The pusher plate 47 then advances into the forward position shown in Fig. 7 and in its movement pushes the tobacco toward a hinged plate 51 which at this stage is moved into the position shown in Fig. 7 by an arm 52 on the frame 48 acting on a lever 53 fast on the spindle or hinge pin of the plate 51 as shown in Fig. 9. A plunger 54 is then caused to descend and force the tobacco through the aperture formed between the edges of the plate $49^x$ and the plate 51 into the wrapper in the mold box beneath. This plunger 54 is carried by an arm or lever 56, mounted on a shaft 57 on which shaft is also mounted an arm 58 see Fig. 4 having at its outer end a curved slot 59 to which is connected by a rod 60 another arm 61 mounted on a stud 62 on the main frame 3. The arm 61 carries a friction bowl 63 fitting a groove 64 in a face cam 65 on the main shaft 1 so that by the rotation of the cam 65 the plunger 54 receives its rising and descending motions the extent of its downward movement being varied as desired by adjusting the position of the end of the connecting rod 60 in the curved slot 59 so as to cause the plunger to compress more or less as required the tobacco in the mold box. When the plunger 54 is in its highest position a rotary brush 55 is caused to operate on it so as to brush off any tobacco that may be clinging to it. The brush 55 is carried in a frame 66 Figs. 1, 4 and 5 which is attached to the main frame and carries a spindle 67 joined to an arm 68 which carries another frame 69 on which is mounted the spindle 70 carrying on one end the rotary brush 55. On the other end of this spindle 70 is a pinion 71 in gear with a wheel 72 (see Fig. 4) driven from a wheel 74 on the main shaft 1 through an intermediate gear wheel 73. The frame 69 is pivoted at 75 to the arm 68 so that the brush 55 may be raised or lowered as required by means of a set screw 76 to allow for wear. On the spindle 67 is an arm 77 provided with a roller 78 bearing against a face cam 79 fast on the main shaft 1 this cam 79 being so timed as to give to the brush 55 a sidewise motion into and out of contact with the plunger 54 at the proper times. After the tobacco has been pressed in the mold box by the plunger 54 the grippers 14, 15 separate and release the wrapper and the mold wheel then makes a partial rotation bringing the next mold box into position to receive the charge of tobacco the one previously charged being moved into the next position in which position the charge of tobacco is pressed at the ends by projections or plungers 80 carried by the spindles 40. These projections or plungers are caused to advance and enter each end of the wrapper so as to compress between them the tobacco endwise and serve also as supports over which the wrapper is folded to form the creases or folds in the wrapper at the angles of the packet. The plungers 80 are tapered or chamfered at their front ends to facilitate their entrance into the wrapper and are moved forward and backward at the proper times by double armed levers 81 centered at 82 to the main frame 3 and acted upon by cams 83 fast on a shaft 84 which carries the disks 12 of the wrapper gripping device hereinbefore described. While these plungers are in the forward position the wrapper is folded over them by folders 85, 86, 87, 88 which operate in sequential order as indicated in Figs. 6, 7, 8 and 9. The folders 85 are first raised from the position shown in Fig. 7 into the position as shown in Fig. 6 by the action of a cam 89 (Figs. 2 and 4) on the main shaft 1 acting on a friction bowl 89× on an arm 90× fast on a shaft 91× carrying the said folders which folders lift the rear edge of the wrapper into the position shown in Fig. 6 whereupon the second folder 86 which is actuated by the cam 27 on the main shaft 1 operating on a friction bowl 27× on an arm 28× fast on the spindle 29× on which the said folder is mounted. This folder engages the said raised edge of the wrapper and presses it over and down on to the tobacco in the mold box and over the plungers 80 as shown in Figs. 7 and 21. The movable portion 31 of the leading side of the mold box is now moved outward by an arm 91 acting on an inclined projection on the said movable side and operated by a cam 92 on the main shaft 1 (see Fig. 5) after which the folder 87 mounted on the shaft 87× is caused to descend by a cam 88× on the shaft 84 acting on a lever 89× so as to fold the overlapping edge 93 of the wrapper (see Figs. 1, 7 and 22) against the leading side of the charge of tobacco in the mold box. The folder 87 then rises again so as to admit of the movable side 31 of the mold box being returned under the action of a spring 94 to its normal position to complete the mold box. The movable side 31 in returning to its position, presses the portion 95 of the wrapper against the part 93 as shown in Figs. 8, 9, 22 and 23, after which the folder 88 is, by a cam 95× on the main shaft 1 acting on the lever 96×, caused (see Fig. 9) to move forward (the folder 86 having in the meantime been raised into the position shown in Figs. 9 and 23) and fold or wipe the projecting end of the portion 95 of the wrapper onto the top of the charge of tobacco in the mold box the charge being thus inclosed on its four sides with the wrapper. The parts 80 are now withdrawn from the ends of the partially-formed packet and the mold-wheel 13 is then caused to make a further partial rotation thereby bringing this partially-formed packet into position to have the ends folded, another of the mold boxes containing a wrapper and charge of tobacco being brought into position to be operated on as last described, while another of the mold boxes is also brought into position to receive a wrapper and a charge of tobacco.

Partially surrounding the mold wheel 13 and in close proximity thereto is a plate 96 Figs. 6, 7, 8 and 9 which serves to retain the wrapper in its folded position while the ends are being folded and to support the packet until it is ejected from the mold box.

The fingers or folders by which the ends of the packet are turned in or folded are shown in Figs. 28 and 29 and drawn to a larger scale in Figs. 30, 31, 32 and 33, while Figs. 31$^A$, 31$^B$, 32$^A$ and 32$^B$ show perspective views of the folders as they operate to make the several folds in one end of the packet, and Fig. 33$^A$ shows a packet with its folds upon one end completed.

On a stud or spindle 97 is secured a frame 98 (Figs. 28 and 29) carrying the two folders or fingers 99 which form the first fold 99× Figs. 33$^A$ and 41 on each end of the packet. These fingers 99 turn in bearings 100 in the said frame 98 and are geared together by toothed segments 101 so as to operate simultaneously. On the spindle of one of these fingers is fixed an additional toothed segment 102 which may be formed in one with the segment 101. The frame 98 together with the fingers 99 are capable of rocking with the spindle 97. The rocking motion of the frame is effected by the cam 25 on the main shaft 1 acting on a friction bowl 90 on an arm 103 fast on the spindle 97, the cam being suitably timed to bring the fingers at the requisite time into the position shown in Fig. 6 to act on the projecting ends of the wrapper the fingers being all in their open positions. The frame 98 being in the position shown in Fig. 6 a cam 104 on the main shaft 1 acting on an arm 105 imparts through the said arm a motion of partial rotation to a sleeve 106 on the shaft or stud 97 (see Figs. 28 and 29) on which sleeve is keyed a segmental rack 107 which gears with the curved rack 102 on the spindle of one of the fingers 99. A partial rotation is thus given to these fingers 99 so as to make the first fold in each projecting end of the wrapper. The edge 107× of each of the fingers 99 is in line with the axis on which the finger turns.

An important feature of this invention consists in making the blades of the fingers 99 concave as shown in Figs. 30 and 31$^A$ so that the sides or edges 108 of the blade first come into contact with the wrapper and as the blade continues to close against the packet the portion of the wrapper between the edges 108 is free to bulge into the concavity as represented by dotted lines at 109 Fig. 30 whereby a neater and more accurate fold is produced than can be depended upon with a flat finger blade. The next two folds 99×× Figs. 33$^A$ and 41 in each of the opposite ends of the wrapper are simultaneously effected by fingers 110, 111, 112 and 113. These fingers are fitted to turn in bearings in the frame 98 and are geared together in pairs by toothed segments 114 (Figs. 2 and 29) the spindle of one of each pair of these fingers being provided with an additional toothed segment 115 by which the two pairs of fingers are geared together. Fast on the stem or spindle of one of the fingers is an arm 116 connected by a rod 117 to an arm 118 keyed on a sleeve 119 fitted to turn on the sleeve 106 by which the fingers 99 are operated. On the sleeve 119 is also keyed an arm 120 which is acted on by a cam 121 on the main shaft 1 and suitably timed to cause these fingers to act immediately after the fingers 99 have made the first folds at each end of the packet. The faces of the fingers 110, 111, 112, 113 are concave as shown at 122 see Figs. 31, 32, 31$^A$ and 31$^B$ and the ends 123 are shaped as shown in Figs 31, 32, 31$^A$, 31$^B$, 32$^A$ and 32$^B$ to fold the wrapper so as to form the final tab 124 as shown in Figs. 8 and 10. The edge 125 of each finger is coincident or in line with the axis of the spindle on which it turns.

The tabs 124 formed by the fingers last described are folded onto the ends of the packet by two other fingers 126 mounted in bearings 127 in a frame 128 (Figs. 28 and 29) secured to the main frames 3 as shown in Fig. 2. On a stud 129 secured to this frame is mounted a segmental rack 130 and projecting from the boss of this rack is an arm 131 provided with a friction bowl 132 which is acted on by a cam 133 (Fig. 1) on the main shaft 1 so as to impart to the rack 130 partial rotation on the stud 129. The rack 130 is in gear with a rack 134 on a boss keyed to the spindle of one of the fingers 126 on which boss is another rack 135* congearing with a similar rack 136* fast on the spindle of the other finger 126 so that the two fingers 126 operate together. The cam 133 is so timed that so soon as the folds $99^{\times\times}$ have been made by the fingers 110, 111, 112 and 113 the segment 130 is caused to turn on the stud 129 and impart through the gearing 134, 135*, 136* a motion of partial rotation to both fingers 126 so as to fold the tabs 124 against the ends 123 of the fingers 112, 113 thereby flattening and securing the shape of the tabs 124 as shown in Figs. 8 and 10 after which the frame 98 carrying the fingers 112, 113 retire to the position shown in Fig. 9 and the fingers 126 are then further rotated so as to close the tabs 124 onto the ends of the packet.

Figs. $31^A$, $31^B$, $32^A$ and $32^B$ show in succession the position of the several fingers in their operation to fold the ends of the packet. Fig. $31^A$ shows the fingers in position to begin their operation; Fig. $31^B$ shows the position of the parts after the finger 99 has been moved by one quarter revolution of its axis to make the first fold $99^{\times}$; Fig. $32^A$ shows the position of the parts when the fingers 112 and 113 have made the folds $99^{\times\times}$; and Fig. $32^B$ when the finger 126 has operated to complete the fold 124, the fingers 99, 112 and 113 being gradually withdrawn as finger 126 folds the tab 124 down upon surfaces 123 of fingers 112 and 113. It is noticed that finger 99 retains its position against the end of the packet while the fingers 112 and 113 operate for the purpose of making the proper angles to the folds or tabs to give smooth work, as shown in Fig. $32^A$. The tabs $99^{\times}$, $99^{\times\times}$ and 124 above referred to are clearly shown in Fig. $33^A$.

The packet is thus completed and while the mold wheel is making the next partial rotation to bring the next mold box containing a charge into position for packing the fingers 126 open out in readiness to operate thereon. The curved plate 96 which partially surrounds the mold wheel has at each of its edges parallel to the ends of the packets and extending inward flanges or lips 135 as shown in Figs. 6 and 7 the object of which flanges is to prevent the last fold in the ends of the packet from opening out while the mold wheel is making the next partial rotation which brings the completed packet into position to have the ends of the packet indented so as to prevent the folds from opening out. The ends of the packet are indented by means of two punches or plungers 136 and 137 mounted on a spindle 138 capable of sliding longitudinally in bearings on the frame 3 of the machine. The faces of these plungers are of the size and shape of the indentation required. The plunger 136 is fixed on the spindle but the plunger 137 is on a sleeve $137^{\times}$ free to slide along the spindle. Both these plungers receive their respective motions from a compound crank 139 on a spindle 140 mounted in a frame 141 secured to the main frames 3. A sleeve 142 incloses the spindle 140 and carries two arms 143 and 144. The arm 144 is connected by a rod 145 to a lever 146 on a shaft $146^{\times}$ and actuated by the cam 65 on the main shaft 1 in which cam works a bowl $147^{\times}$ carried on a lever $148^{\times}$ fast on the said shaft $146^{\times}$. The compound crank 139 has projecting therefrom a quadrant 148 having therein a slot 149 with which engages a stud 150 on the arm 143 and which projects through said quadrant for the purpose hereinafter described. A connecting rod 151 on one of the crank pins of the compound crank connects the crank to the spindle 138. Another connecting rod 152 on the other crank pin of the compound crank connects the said crank to the sleeve $137^{\times}$. These crank pins are directly opposite each other so that the connecting rod 145 being moved in the direction shown by the arrow Fig. 3 and the stud 150 being secured by a nut in position in the quadrant 148 as shown in Fig. 5 the compound crank will make a partial rotation causing the plunger 137 to be pushed outward from the compound crank and the spindle 138 is drawn in with the plunger 136 toward the crank the packet in the mold box situated between the plungers being thus indented by the front ends of the said plungers. The cam 65 Fig. 2 will then move the connecting rod 145 in the reverse direction and so through the compound crank separate the plungers 136 and 137. The amount of compression exerted by the plungers can be altered by adjusting the position of the stud 150 in the quadrant 148.

The arm 143 on the sleeve 142 is extended and secured to one end of a stud 153—the other end of the said stud 153 being connected to a lever or arm 154 which causes an ejector 155 to push the completed packet out of the mold box. This ejector though driven from the same source as the plungers 136 and 137 is not affected by any alteration in the adjustment of the compression. The packets when ejected from the mold boxes fall onto an endless band 156 by which they are carried out of the machine.

Having now particularly described and ascertained the nature of the said invention and in what manner the same is to be performed, I declare that what I claim is—

1. In a machine for wrapping tobacco and similar articles in packets of rectangular form, the combination substantially as described and shown, with mold boxes or recesses in which the packets are formed, of means for feeding wrappers in an unfolded condition to the mold boxes, devices for gripping the wrappers and carrying them into position in the mold boxes, and mechanism for feeding the tobacco or like material into and pressing it in the mold boxes.

2. In a machine for forming rectangular packets of tobacco or other material, the combination substantially as described and shown, with mold boxes in which the packets are formed, and means for feeding to the mold boxes the material to be packed, of a plunger for compressing the material in the mold boxes, a rotary device for cleaning the plunger, and means for operating said device.

3. In a machine for forming rectangular packets of tobacco and other material, the combination substantially as described and shown, with mold boxes in which the packets are formed, of an endless band or chain carrying propellers or attachments by which the wrappers are carried into position to be engaged by gripping disks which propel them into position to be inserted in the mold boxes and wrapper-edge guides between which the endless belt or chain travels.

4. In a machine for forming rectangular packets of tobacco or other materials, the combination substantially as described and shown, with mold boxes in which the packets are formed, of an endless band or chain carrying propellers or attachments for feeding the wrappers into the machine, gripping disks 11 and 12 which receive the wrappers from the endless band or chain and convey them into position over the mold boxes, disks $11^\times$ and $12^\times$ for releasing the wrappers from the gripping disks 11 and 12, means for inserting the wrappers into the mold boxes and means for operating the wrapper-feeding, gripping and inserting parts or devices.

5. In a machine for forming rectangular packets of tobacco or other materials, the combination substantially as described and shown, with mold boxes in which the packets are formed, of an endless band or chain carrying propellers or attachments for feeding the wrappers into the machine, gripping disks 11 and 12 which receive the wrappers from the endless band or chain and convey them into position over the mold boxes, disks $11^\times$ and $12^\times$ for releasing the wrappers from the gripping disks 11 and 12, and gripping devices 14 and 15 which retain the wrappers in position over and press them into the said mold boxes, and means for operating the wrapper-feeding and gripping devices.

6. In a machine for forming rectangular packets of tobacco or other materials, a wheel provided with recesses or mold boxes in its periphery, each mold box having one of its sides movable, in combination with means for moving the said movable side away from the mold boxes and returning it into position again, and a folding finger for folding one edge of the wrapper against the material of the packet when the movable side of the mold box is removed therefrom, and means for operating the same, substantially as described and shown.

7. In a machine for forming rectangular packets of tobacco or other materials, the combination substantially as described and shown, with mold boxes in which the packets are formed, of movable plates or projections 39 for temporarily extending the front sides of the mold boxes and means for feeding the wrappers into the mold boxes.

8. In a machine for forming rectangular packets of tobacco or other materials, the combination substantially as described and shown, with movable bars, blocks or plungers 80 for compressing the material endwise in the mold boxes and devices for operating the same, of devices for folding the wrappers sidewise around and pressing them against the said bars, blocks or plungers, and means for operating the said devices.

9. In a machine for forming rectangular packets of tobacco or other materials, the combination substantially as described and shown, with mold boxes provided with movable sides in which the packets are formed, and plungers 80 which press the material endwise into the mold boxes and means for operating the same, of folding fingers 85, 86, 87 and 88, and means for operating the same, whereby the wrappers are folded around the material in the mold boxes and around the plungers 80, for the purpose described.

10. In a machine for forming rectangular packets of tobacco or other materials, the combination substantially as shown and described, with mold boxes each having a movable side, of a folding finger constructed and arranged to fold one edge of the wrapper into the position upon the material occupied by the movable side, and mechanism for operating the said movable side and the folding finger.

11. In a machine for forming tobacco or other materials in rectangular packets, the combination substantially as described and shown, with means for feeding wrappers and material to be inclosed thereby into mold boxes in which the packets are formed, and fingers or folders for folding the wrappers around the material, of fingers 99, 110, 111, 112, 113 and 126, constructed and arranged to operate to fold the ends of the packet by a movement given to the operative surface of the fingers by a partial rotation of their axes, the said fingers being also geared together in pairs as described, so as to fold both ends of the packet simultaneously, and means for operating the said fingers.

12. In a machine for forming rectangular packets of tobacco and other materials, fingers 99 which make the first fold in the ends of the packet, having their faces which fold the wrapper against the material concaved, whereby the wrappers are permitted to bulge when making the fold, substantially as described and shown.

13. In a machine for forming rectangular packets of tobacco or other materials, fingers 110, 111, 112, and 113, which make the second folds in the ends of the packet, provided with a flat surface against which the tabs which form the last fold of the packet are pressed and flattened, in combination with fingers 126, constructed and arranged to press the tabs which form the last fold down upon the flat surface of fingers 110, 111, 112 and 113 before said tabs are folded into position upon the packet, and means for operating the said fingers, substantially as described and shown.

14. In a machine for forming rectangular packets of tobacco or other materials, fingers 126 for folding the last tabs of the packet, in combination with fingers 110, 111, 112 and 113, the said sets of fingers being constructed and arranged whereby fingers 126 fold and flatten the last tabs against the surfaces of fingers 110, 111, 112 and 113, and then fold said tabs against the ends of the packets, and means for operating the said fingers, substantially as described and shown.

15. In a machine for forming rectangular packets of tobacco and other materials, the combination substantially as described and shown, with a wheel provided with recesses or mold boxes in its periphery in which the packets are formed, of a curved plate partially surrounding the mold wheel and provided with flanges at its edges to retain the packets in the mold boxes and prevent the end folds of the packets from becoming unfolded.

16. In a machine for forming rectangular packets of tobacco and other materials, the combination substantially as described and shown, with a wheel provided with recesses or mold boxes in its periphery, of a curved plate partially surrounding the mold box wheel, and plungers 136 and 137 constructed and arranged for indenting or creasing the ends of the packets and means for operating the same.

17. In a machine for forming rectangular packets of tobacco and other materials the combination of a wheel (13) having recesses or mold boxes therein in which the packets are formed, an endless band or chain (6) carrying propellers (7) for feeding into the machine the wrappers in which the material is to be inclosed, gripping disks (11 and 12) for conveying the wrappers from the propellers into position over the mold boxes, means for releasing at the required periods the wrappers from the grip of the disks, a gripping device (14. 15) for pressing the wrappers into the mold boxes, an endless chain of buckets (42) for conveying the charges of material into a hopper (46) provided with a removable bottom or sliding plate (47) which temporarily supports a charge of material and then pushes it into a mold box, a plunger (54) for pressing the material down in the mold boxes, bars or plates (39 and 41$^\times$) forming temporary extensions to the front and rear sides of the mold boxes, while the wrappers and material are being pressed therein, plungers (80) for compressing the material endwise in the mold boxes, and for forming a temporary support round which the wrappers are folded to form the creases at the angles of the packets, fingers or folders (85, 86, 87, 88) for folding the wrappers round the material, curved plate (96) for retaining the packets in the mold boxes, fingers or folders (99, 110, 111, 112, 113 and 126) for forming the end folds in the wrappers and pressing them against the ends of the packets, sides or flanges 135 on the curved plate 96 for the purpose of retaining the folds in the ends of the packets, plungers or creasers (136, 137) for indenting the ends of the packets for the purpose of securing the folds therein; an ejector 155 for forcing the finished packets from the mold boxes, and means for imparting to the several parts their necessary movements substantially as hereinbefore described.

In testimony whereof I have signed my name to this specification in the presence of two subscribing witnesses.

W. ROSE.

Witnesses:
   J. R. RAITHBY,
48 *Burton Road, Lincoln, Notary's Clerk.*
   J. BROWN,
*Westgate, Lincoln, Notary's Clerk.*